United States Patent [19]

Neiger et al.

[11] Patent Number: 5,963,408
[45] Date of Patent: *Oct. 5, 1999

[54] GROUND FAULT CIRCUIT INTERRUPTER INCORPORATING MISWIRING PREVENTION CIRCUITRY

[75] Inventors: Benjamin Neiger, Floral Park; Saul Rosenbaum, East Meadow; Bernard Gershen, Centerport, all of N.Y.

[73] Assignee: Leviton Manufacturing Co., Inc., Little Neck, N.Y.

[ * ] Notice: This patent is subject to a terminal disclaimer.

[21] Appl. No.: 09/001,479

[22] Filed: Dec. 31, 1997

Related U.S. Application Data

[63] Continuation of application No. 08/746,692, Nov. 14, 1996, Pat. No. 5,706,155, which is a continuation of application No. 08/572,811, Dec. 15, 1995, Pat. No. 5,729,417, which is a continuation of application No. 08/089,149, Jul. 8, 1993, Pat. No. 5,477,412.

[51] Int. Cl.$^6$ ........................................................ H02H 3/16
[52] U.S. Cl. ................................ 361/45; 361/49; 340/650
[58] Field of Search ................................. 361/42, 45, 49, 361/43–44, 46–48, 50; 340/635, 650, 653, 654, 657

[56] References Cited

U.S. PATENT DOCUMENTS 4,084,203  4/1978  Dietz et al. .............................. 361/45

*Primary Examiner*—Michael J. Sherry
*Attorney, Agent, or Firm*—Paul J. Sutton

[57] ABSTRACT

A ground fault circuit interrupter (GFCI) with built in intelligence is described that includes circuitry to automatically indicate a device miswiring condition. When a GFCI is wired with its AC and LOAD terminals reversed, downstream devices are still protected in the event of a ground fault but the duplex receptacle on the GFCI itself is not. The invention incorporates miswiring sense circuitry that automatically triggers the generation of visual and audible alarms in the event a miswiring condition is sensed. The invention employs an alarm inhibiting technique that incorporates sense circuitry connected to the AC terminals on one side of the internal GFCI switches or relays and alarm generation circuitry connected to the LOAD terminals on the opposite side.

7 Claims, 6 Drawing Sheets

GROUND FAULT CIRCUIT INTERRUPTER INCORPORATING MISWIRING PREVENTION CIRCUITRY

This is a continuation of application Ser. No. 08/746,692 filed Nov. 14, 1996 now U.S. Pat. No. 5,706,155 which is a continuation of application Ser. No. 08/572,811 filed Dec. 15, 1995 now U.S. Pat. No. 5,729,417 and which in turn is a continuation of application Ser. No. 08/089,149 filed Jul. 8, 1993 and now U.S. Pat. No. 5,477,412 issued Dec. 19, 1995.

BACKGROUND OF THE INVENTION

Ground Fault Circuit Interrupters (GFCI) are electrical devices in wide spread use today. They are designed to protect users against shock hazards by detecting very low levels of ground fault current. GFCIs are widely employed in both commercial and residential environments. A typical GFCI incorporating a duplex receptacle provides protection for devices plugged into itself and all devices located downstream of the GFCI device. Typically GFCIs are four terminal devices, two hot or AC leads for connection to AC electrical power and two LOAD leads for connection to downstream devices. Properly wired, a GFCI provides ground fault protection to downstream devices connected to its LOAD leads and to devices plugged into the GFCI receptacle itself. However, if the GFCI is reverse wired or improperly wired then downstream devices are still protected if there is a ground fault but the duplex receptacle on the GFCI itself is not.

In spite of detailed instructions that come packaged with most GFCIs and identification of AC and LOAD terminals, GFCIs are sometimes miswired. One possible reason for this miswiring is that in a new home there may not be any power coming into the distribution panel, making it difficult to identify which wires are the AC and which are the LOAD. The problem is compounded when it is considered that most GFCIs have a test button that will trip and shut off the power when pushed to verify operation of internal functions in the GFCI. However, use of the test button does not indicate whether the built in duplex receptacle is protected. Typical users may not be aware of this. Users simply test the device after installation and verify that the unit trips upon pressing the test button by way of an audible click, for example. This gives the user a false sense that all is well. What is actually happening is that the GFCI disconnects power from and protects everything downstream, but does not protect the receptacle contacts of the GFCI itself. The device will trip depending on the condition of internal components and irrespective of the how the GFCI was wired. It does not matter that the GFCI was reverse wired when it is tested.

One way for a user to verify that the GFCI is properly wired is to plug an electrical device or test lamp into the receptacle contacts of a GFCI and monitor it going off and on when pressing the test followed by the reset buttons. However, this is time consuming and labor intensive. Moreover, even when explained clearly in instructions provided with the GFCI, some users do not always follow them.

Therefore, it is quite apparent that there is a strong need for an automatic way to sense when a GFCI is miswired and to indicate to the user by visual (i.e. blinking light) or audible (i.e., loud buzzer) indications. In addition, when the GFCI is improperly wired the user needs to be alerted with alarms that cannot be stopped until the electricity is disconnected and the GFCI is correctly wired.

Although the prior art has attempted to solve this problem, the so called solutions have their own disadvantages and drawbacks. For example, one approach utilizes a GFCI with reverse line polarity lamp indicator to indicate proper installation of the GFCI. However, a push button needs to be manually pressed in order to detect whether the GFCI is miswired. An apparent drawback with this scheme is that the test is never self initiating, i.e., automatic, since the user must always remember to actually press a button to test the GFCI. In addition, no audible signal is generated to alert the user of a miswiring condition.

SUMMARY OF THE INVENTION

A primary object of the present invention is to provide a system capable of automatically indicating when a GFCI is miswired or not properly electrically connected to its source of electrical power and to subsequently generate an alarm indicating to the user that a potentially unsafe condition exists.

Another object of the present invention is to provide a reliable miswiring indicating function irrespective of how the GPCI is connected to the electrical wiring. This is achieved whether the AC and LOAD terminals are simply reversed or if they are cross reversed, meaning the AC hot and neutral are connected not to the AC or LOAD side but to either the AC-hot and LOAD-hot terminals or the AC-neutral and LOAD-neutral terminals.

Yet another object of the present invention is to have the alarm remain in the on state once generated, until the user corrects the miswiring problem. More specifically, once the alarm is generated it is latched and cannot be shut off without removing the device and installing it properly.

Still yet another object of the present invention is to provide both a visual alarm and an audible alarm in the event a miswiring condition is detected. The visual alarm might be in the form of a blinking light. The audible alarm might be in the form of a buzzing or high tone sound that could beep on and off at a suitable rate.

The foregoing and other objects and advantages which will be apparent in the following detailed description or in the practice of the invention, are achieved by the invention disclosed herein, which generally may be characterized as a ground fault circuit interrupter comprising ground fault current interrupter means electrically connected between a source of electrical power and a load for interrupting the flow of electrical current from the source of electrical power to a load when a ground fault condition exists and indicating means responsive to the ground fault current interrupter for automatically indicating that the ground fault current interrupter is not properly connected to the source of electrical power.

BRIEF DESCRIPTION OF THE DRAWINGS

Serving to illustrate exemplary embodiments of the invention are the drawings of which.

DETAILED DESCRIPTION OF THE INVENTION

In order to afford a complete understanding of the invention and an appreciation of its advantages, a description of a preferred embodiment in a typical operating environment is presented below.

Figure 1:
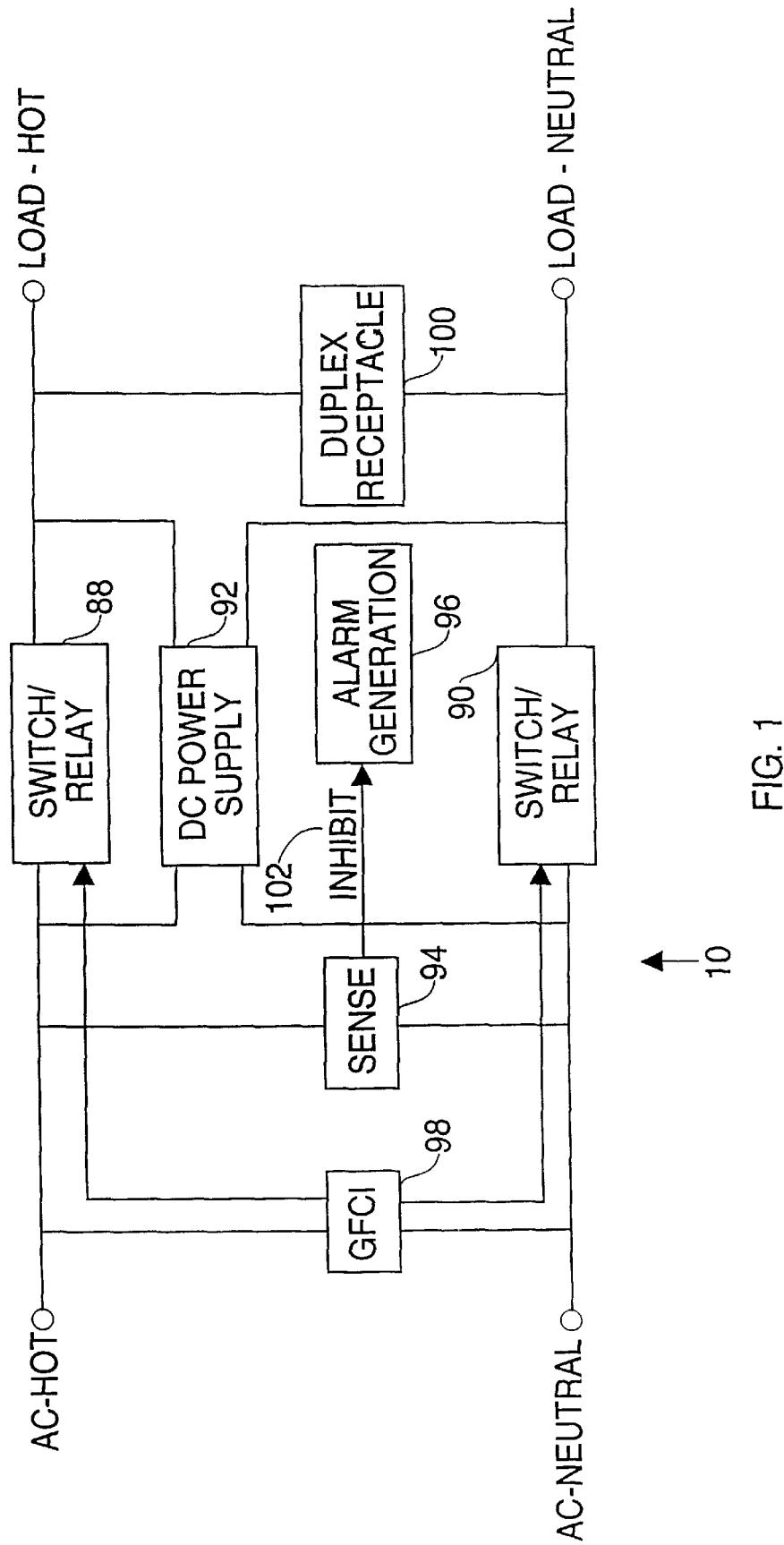
FIG. 1 is a functional block diagram of the preferred embodiment of the GFCI of the present invention.

Shown in FIG. 1 is a functional block diagram of the GFCI Incorporating Miswiring Prevention Circuitry (GFCIMPIO). The GFCI 98 circuitry is depicted as a black box connected across the AC hot and neutral terminals with control signals going to both switch relays 88, 90. The GFCI circuit 98 can be any typical industry standard type GFCI circuit that removes the power delivered to the load upon detection of a ground fault. Also included in many standard GFCIs is a duplex receptacle 100 built into the device. The duplex receptacle 100 is connected to the LOAD hot and neutral terminals of the GFCIMP 10 in order that power to it, besides devices downstream, be disconnected from the AC power upon the occurrence of a ground fault.

Traditional GFCIs consist mainly of these three elements, GFCI 98, switches 88, 90, and the duplex receptacle 100. The GFCIMP 10 employs additional circuitry to indicate the improper wiring of the device in an electrical system. The additional elements are a sense circuit 94, alarm generation circuit 96 and power supply circuit 92. Each will be explained in detail below. The alarm generation circuit 96 will automatically generate an alarm if the following two conditions are met: it is provided with power from the power supply circuit 92 and it does not receive an inhibit signal 102 from the sense circuitry 94. The power supply circuit 92 is connected across hot and neutral on both sides of the switches 88, 90. This connection scheme allows the power supply 92 to receive AC power regardless of how the user wires the GFCIMP 10 into the electrical system. This arrangement provides the alarm generation circuitry 96 with a reliable source of power to be able to alert the user if there is a miswiring condition.

Figure 2:
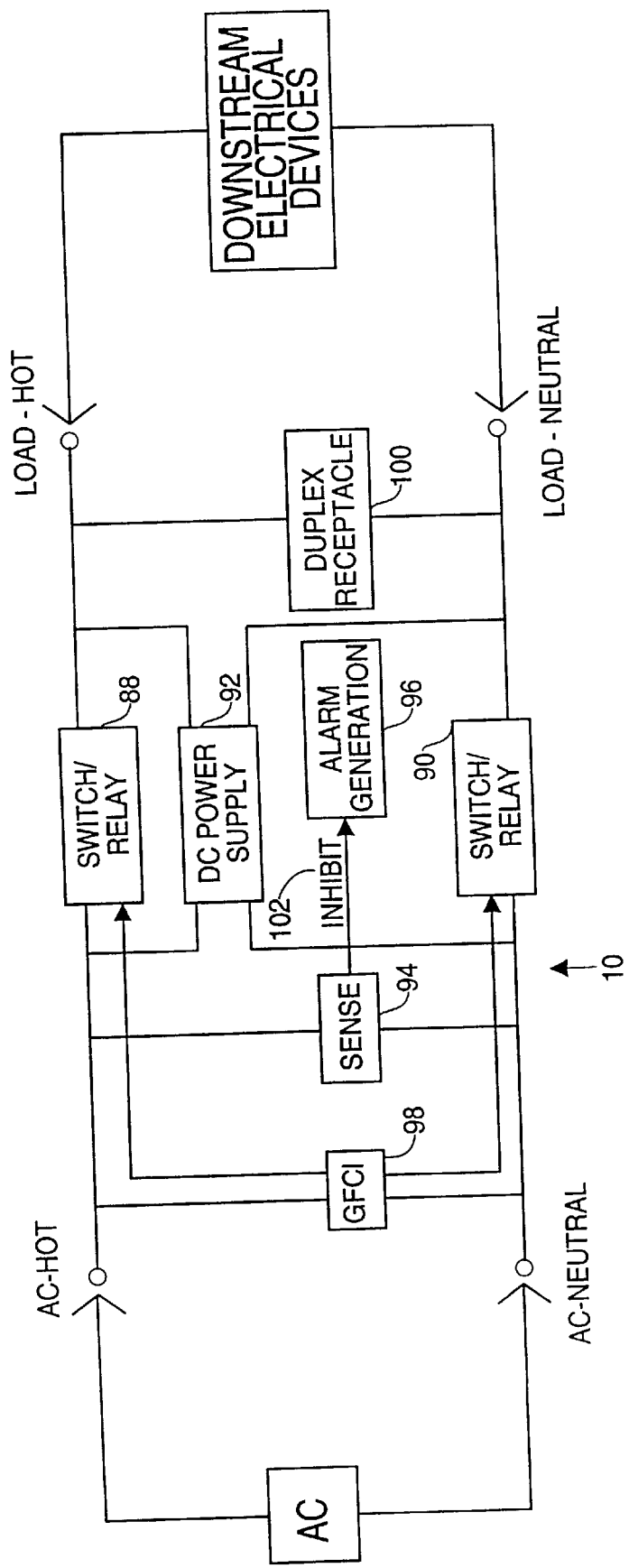
FIG. 2 is a functional block diagram showing the proper wiring configuration of the GFCI of the present invention.

Possible wiring configurations of the GFCIMP 10 are shown in FIGS. 2, 3, 4 and 5. Assuming power is available, the only way the alarm generation circuitry 96 can be prevented from generating audible and visual alarms is if the inhibit signal 102 is produced. The sense circuitry 94 requires AC power to be present on the AC hot and neutral terminals in order to generate an inhibit signal 102. It does not matter, however, that hot and neutral are reversed for the inhibit signal 102 to be generated. Thus, the wiring arrangement shown in FIG. 2 is the only one that does not cause an alarm to be generated. AC power must be properly connected to the AC hot and neutral terminals to suppress alarm generation. The GFCIMP 10, in FIG. 2, properly protects downstream devices along with its own receptacle 100. The inhibit signal 102 remains present to suppress generation of the alarm by the alarm generation circuitry 96.

Figure 3:
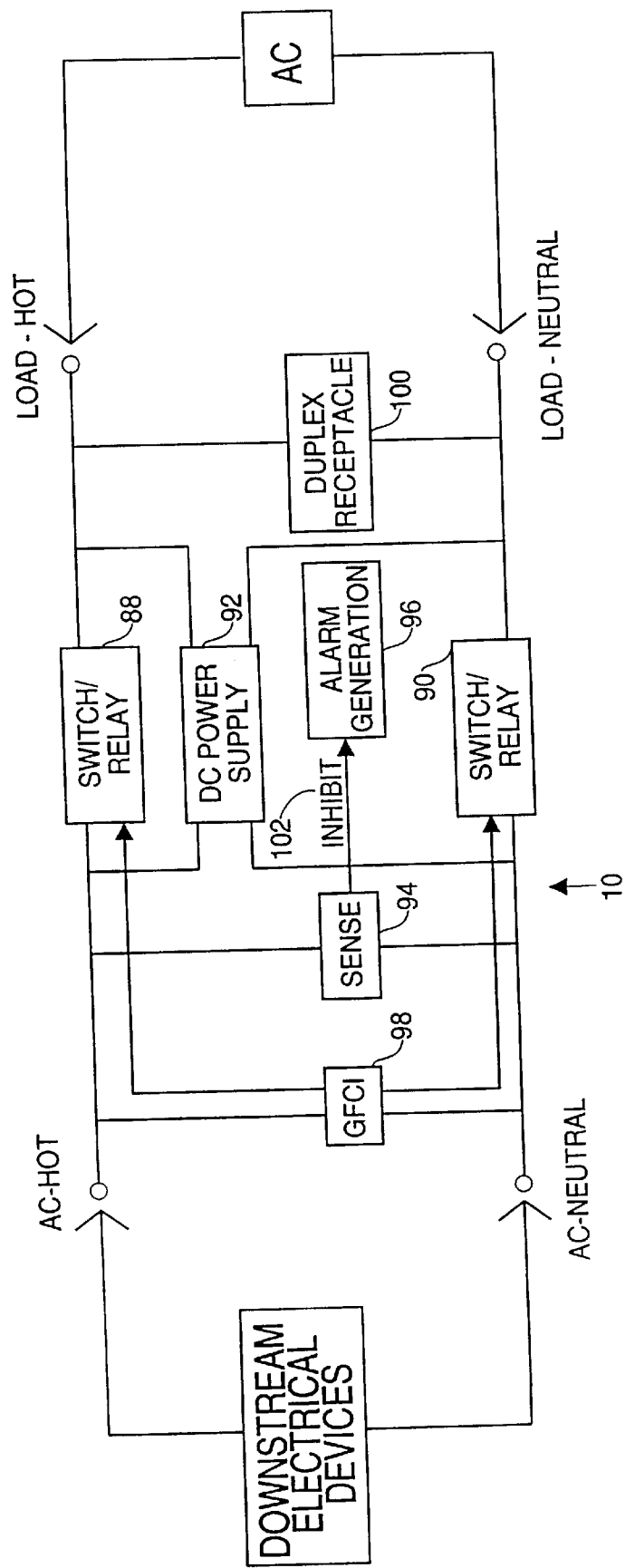
FIG. 3 is a functional block diagram showing one improper method of wiring the GFCI of the present invention to an electrical wiring system.
Figure 4:
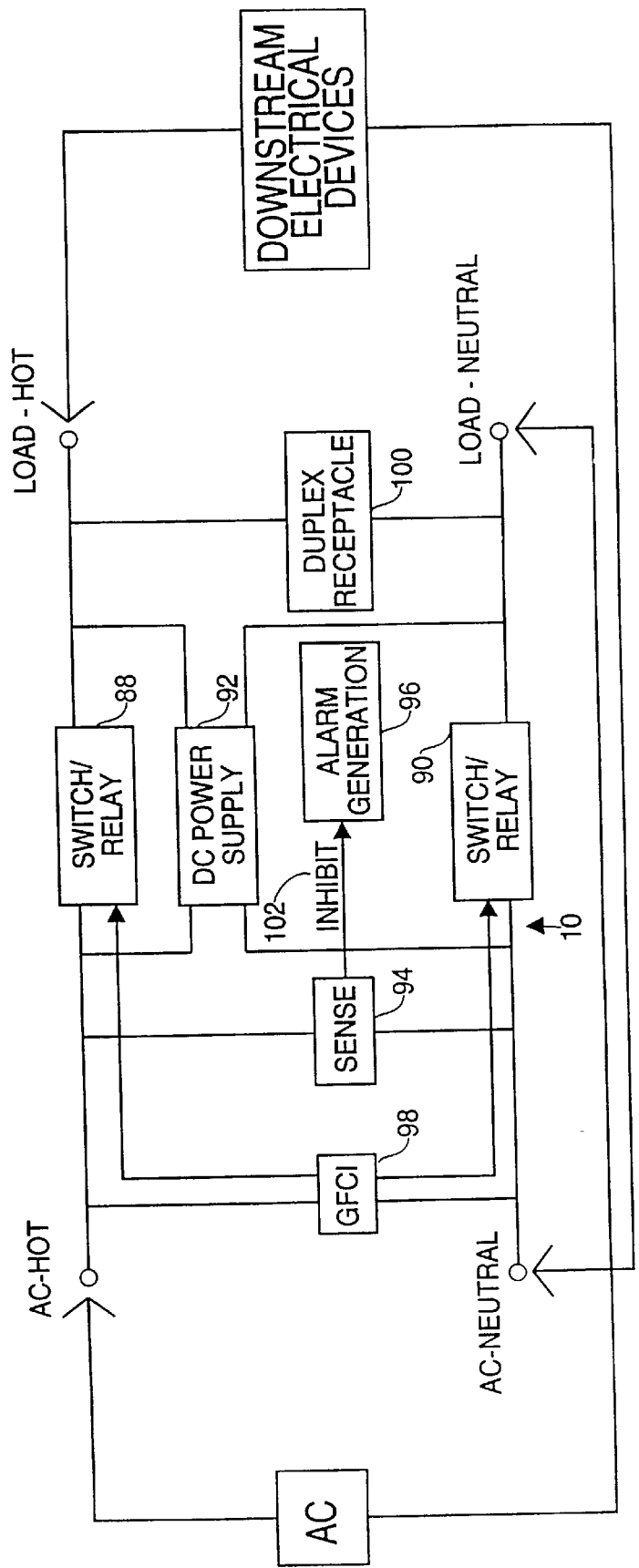
FIG. 4 is a functional block diagram showing a second improper method of wiring the GFCI of the present invention to an electrical wiring system.

The GFCIMP 10 if connected as shown in FIGS. 3 and 4 will cause the alarm to be generated because the alarm generation circuitry 96 does not receive an inhibit signal 102 needed to suppress alarm generation. In FIG. 3 the downstream device is connected to the AC hot and neutral terminals of the GFCIMP 10. Thus no AC power is available to produce the inhibit signal 102. The AC power is connected to the LOAD hot and neutral terminals of the GFCIMP 10. When the switches 88, 90 are closed, the GFCIMP 10 apparently operates normally, opening the circuit when a ground fault is detected. Since power is present at the sense circuitry 94 terminals the inhibit signal 102 is generated and suppresses alarms. However, the first time the GFCIMP 10 trips for any reason (i.e., ground fault or manual test) AC power will be removed from the sense circuitry 94. This causes the alarm to be produced because of the absence of the inhibit signal 102. The wiring configuration shown in FIG. 3 depicts the most common GFCI miswiring by users. Thus use of an GFCIMP 10 with miswiring sensing and alarm generation circuitry is likely to prevent the potentially dangerous condition of the GFCI receptacle 100 not being protected.

Another improper configuration of the GFCIMP 10 is shown in FIG. 4. Here, the AC power is connected across the AC hot terminal and the LOAD neutral terminal. Whether the switches 88, 90 are closed or open, the power supply circuitry 92 has AC power available to generate DC power for the alarm generation circuitry 96. The downstream device is connected to the AC neutral and LOAD hot terminals. When the switches 88, 90 are closed, the sense circuitry 94, being powered, generates the inhibit signal 102 suppressing alarm generation. However, when the switches 88, 90 open, AC power is cutoff from the sense circuitry 94 causing the inhibit signal 102 to be removed and the alarm to be generated. The scenario is the same if the AC power and LOAD connections are reversed. This incorrect wiring arrangement is less likely to occur since most users do not interconnect AC and LOAD terminals when installing the GFCI.

Figure 5:
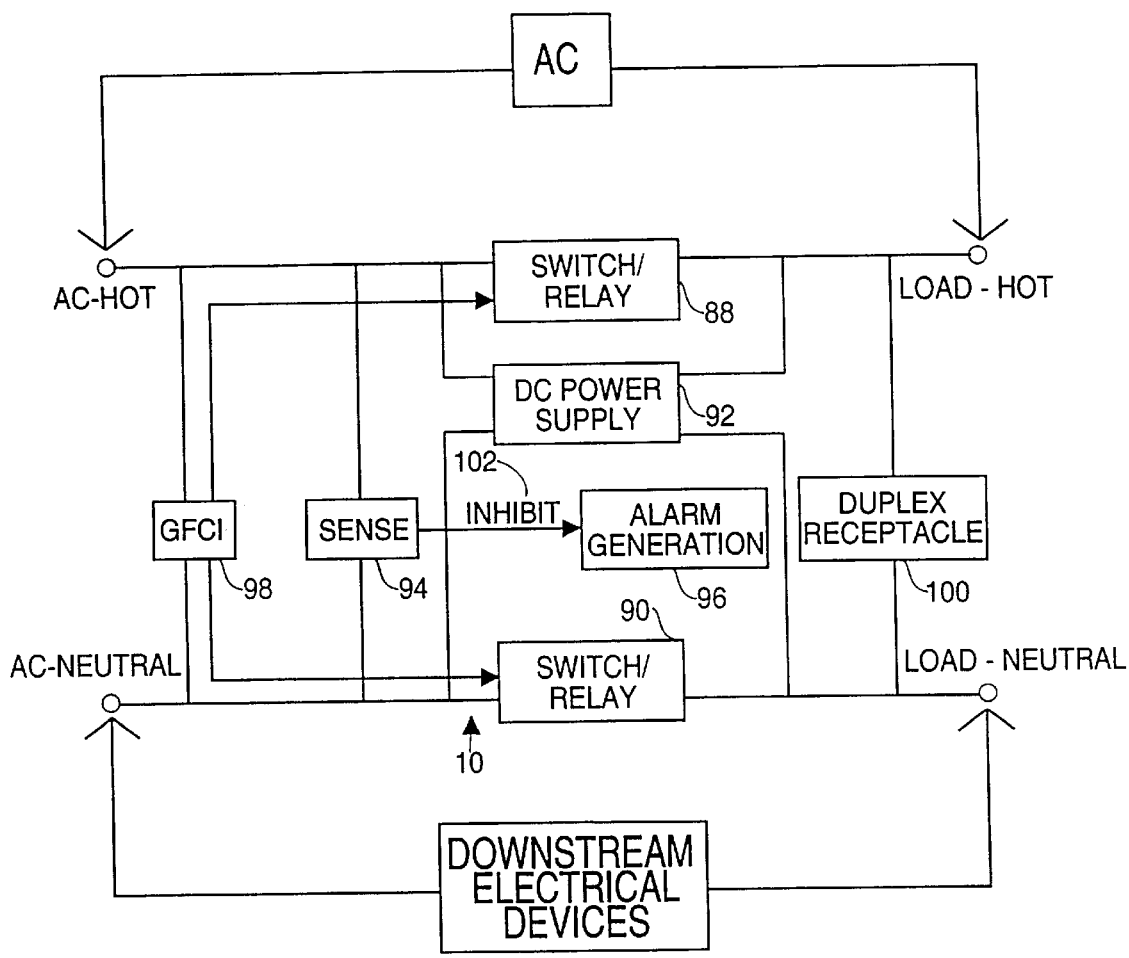
FIG. 5 is a functional block diagram showing a third improper method of wiring the GFCI of the present invention to an electrical wiring system.

The configuration shown in FIG. 5 is also an improper way of wiring the GFCIMP 10 into the electrical system. However, when the device is installed and reset and the power is subsequently applied, the AC electrical breaker or fuse will trip or blow. This is because AC power has been wired to short out as soon as power is applied. This also occurs if the AC power and LOAD connections are reversed.

Figure 6:
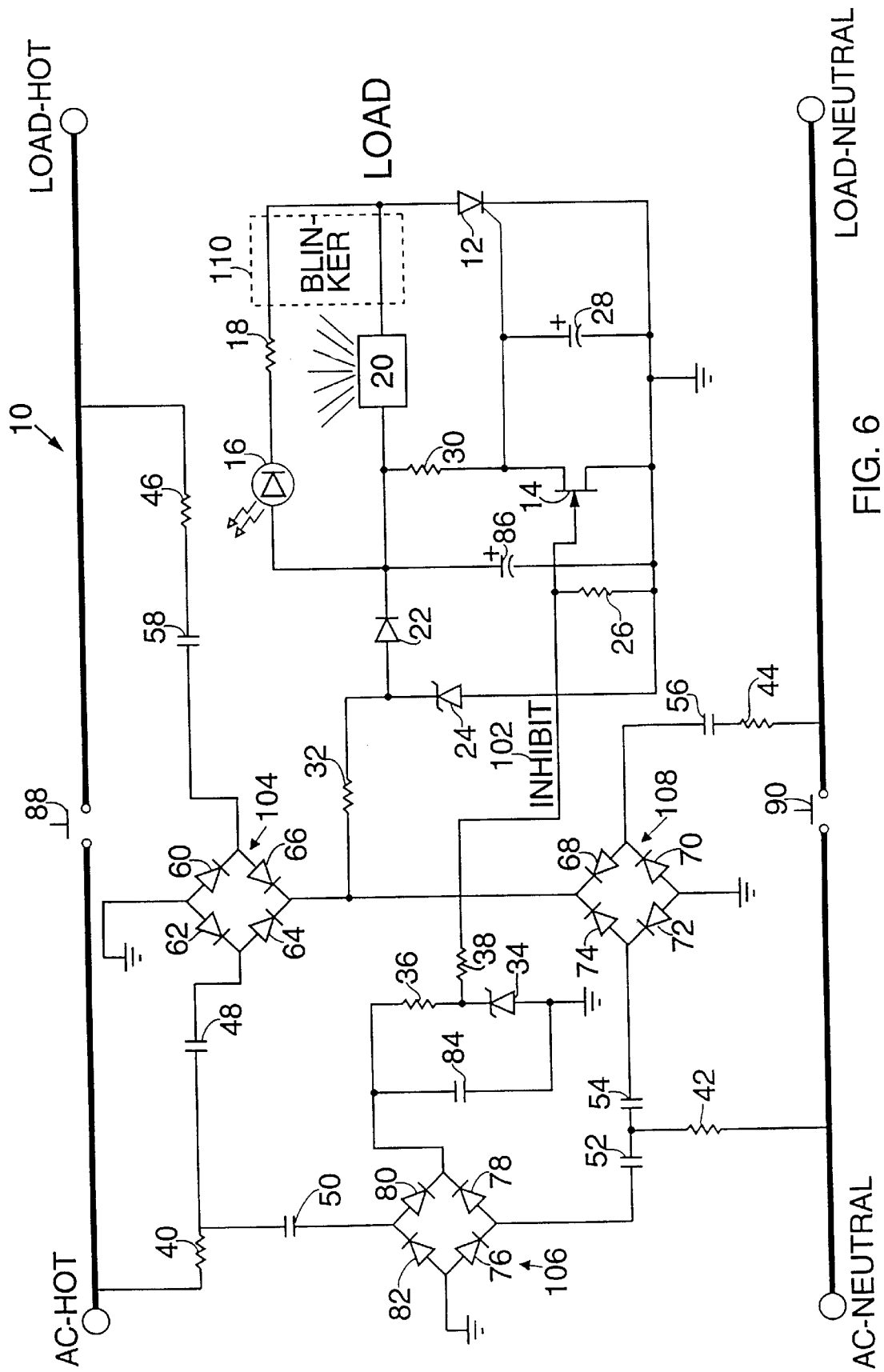
FIG. 6 is a detailed schematic diagram of the circuit comprising the preferred embodiment of the GFCI of the present invention.

As shown in FIG. 6, the power supply circuitry 92 utilizes four connections to generate DC power from the AC source. Due to the various ways a user can wire the GFCIMP 10 device into the electrical system, connections to hot and neutral are provided on both the AC and LOAD sides of the switches 88, 90. Consequently, whether the switches 88, 90 are open or closed the power supply 92 generates DC voltage for the alarm generation circuitry 96. The power supply 92 is a floating supply meaning that the grounded DC system created is not referenced to the AC source system it is generated from. AC power is fed through current limiting resistors 40, 42, 44, 46 to blocking capacitors 48, 54, 56, 58 respectively. Typical values for the resistors are 47K ohms and for the capacitors 0.1 uF rated at 250V. If AC power is applied to the AC terminals of the GFCIMP 10 then diode 64 rectifies the positive cycle of the AC wave form. If the device is wired incorrectly with AC power at the LOAD terminals, diode 66 rectifies the positive AC wave form. If the switch 88 is closed then both diodes 64 and 66 rectify the AC wave. In either case resistor 32, nominally 10K ohm, provides current limiting for the DC load. Zener diode 24, typically 12 volts, clamps the rectified AC wave form at the zener voltage. Current flow though blocking diode 22 and causing capacitor 86, typically 100 uF rated at 16V, to charge up to the zener voltage minus a diode drop. The blocking diode 22 prevents the capacitor 86 from discharging during the time the AC cycle is lower than the zener 24 voltage.

Current passes through the DC load, which is the alarm generation circuitry 96, and returns through the floating ground to the AC source through diode 72, 70 or both, depending on whether AC power is connected to the AC terminals or the LOAD terminals and whether the switches 88, 90 are open or closed. The return path is through dropping capacitors 54 or 56 and current limiting resistors 42, 44. The current limiting resistors and dropping capacitors are employed to meet UL standards and for safety. Thus if the diode bridges 104 or 108 fail, there still will be 50K ohms of resistance if the switches 88, 90 are closed. Each pair of resistors 40, 46 and 42, 44 in parallel form an equivalent 25K ohms resistor. The two parallel combinations in series are the equivalent of 50K ohms. If the switches 88, 90 are open, two 50K ohms combine to form 100K ohms in series with the AC power. Either scenario limits the current to 1 or 2 mA, which is within UL standards.

The sense circuitry 94 functions to generate an inhibit signal 102 only when AC power is applied to the AC hot and neutral terminals. As already mentioned, this can be achieved in a number of ways while the switches 88, 90 are closed. However, when the switches 88, 90 are open, the only one way the AC power can be connected to the GFCIMP 10 and consequently cause the sense circuitry 94 to generate an inhibit signal 102 is with the AC power connected to the AC hot and neutral terminals.

In a typical wiring configuration AC power, during the positive half cycle, passes through current limiting resistor 40 and dropping capacitor 50. Diode 80 rectifies the AC wave form and subsequently capacitor 84 charges. Resistor 38 further current limits the signal and zener diode 34, typically 12 volts, limits the voltage of the inhibit signal 102. Resistors 38 and 26 act as voltage dividers. Both typically being 50K ohms, they divide the voltage roughly in half. Resistors 38, 26 also serve as a path for current since the gate on JFET 14 has an extremely high input impedance. Capacitor 84 also serves to maintain a DC level of the gate of JFET 14 which could be a National Semiconductor 2N5457, for example. It is noted that almost any device with low current requirements could perform adequately in place of JFET 14. The return path for ground is through diode 76 of bridge 106.

The scenario for the negative half cycle is similar except that current now flows through diode 78 to charge capacitor 84 and subsequently produce the inhibit signal 102. The ground return path is now through diode 82.

The alarm generation circuitry 96 section of the GFCIMP 10 is responsible for controlling and generating audible and visual alarms in response to an inhibit signal 102. The visual element consists of an LED 16 that could be of a variety that includes blinking circuitry built in or does not. The audible element is a piezo transducer 20 or other suitable element that likewise could incorporate circuitry built in that turns the element on and off at an appropriate rate. Alternatively, blinking circuitry 110 can be included that provides this feature. Blinking circuitry is preferred because a low duty cycle for the LED 16 and piezo transducer 20 means much less current is required for alarm generation. This causes less of a current drain on the capacitor 86, allowing it to better maintain the zener 24 voltage. Thus the few milliamps charging capacitor 86 is sufficient to provide power to generate the alarms.

The inhibit signal 102 generated by the sense circuitry 94 discussed earlier is fed to the gate of n-channel JFET 14. When the inhibit signal 102 is present, the JFET 14 turns on effecting a very low impedance path from drain to source. Subsequently, current flows through gate current supply resistor 30 to ground. Thus capacitor 28 is discharged and is prevented from further charging. This in turn deprives the SCR 12 of sufficient gate current to turn on. Current through the LED 16 and piezo transducer 20 is prevented from flowing because there is no return path through the SCR 12. When the GFCIMP 10 is properly wired into the electrical system this is the state the device remains in whether the switches 88, 90 are open or closed.

When AC power is first applied to the GFCIMP 10, it is possible that SCR 12 might trigger and cause the alarm to be generated before the inhibit signal 102 appears at the gate of JFET 14. Thus the alarm sounds even though the GFCIMP 10 is properly wired into the electrical system. Capacitor 28 serves to prevent this from occurring by delaying the gate signal to SCR 12 in reference to the inhibit signal 102. In order for the SCR 12 to trigger and turn on, capacitor 28 must charge to a sufficient voltage. This delay time gives the sense circuitry 94 a chance to generate the inhibit signal 102 when the GFCIMP 10 is properly wired.

When the GFCIMP 10 is miswired to prevent the inhibit signal 102 from being generated, due to the lack of AC power on the AC hot and neutral terminals, the JFET 14 does not receive any gate drive voltage. The JFET 14 now has a very high impedance from drain to source and current flows through resistor 30, providing gate current for SCR 12, and charging capacitor 28. Sufficient gate current is now available to turn on SCR 12 and current can flow through LED 16 and piezo transducer 20 causing the audible and visual alarms to be generated. Once SCR 12 is triggered and turns on it becomes latched and cannot be turned off. This has the effect of forcing the user to rewire the GFCIMP 10 correctly if he wants to prevent the alarms being generated.

It is clear that the above description of the preferred embodiment in no way limits the scope of the present invention which is defined by the following claims.

What is claimed is:

1. A ground fault circuit interrupter device electrically connected between a source of AC power and an electrical load for interrupting a flow of electrical current from said source of AC electrical power of said load when a ground fault condition is present comprising:

a) a first selectively operable switch in a hot line extending from said AC power source to said electrical load, said first switch operable in a first condition to permit the flow of current from said AC power source to said electrical load in said hot line and operable in a second condition to prevent the flow of current in said hot line from said AC power source to said electrical load;

b) a second selectively operable switch in a neutral line extending from said AC power source to said electrical load, said second switch operable in a first condition to permit the flow of current from said AC power source to said electrical load in said neutral line and operable in a second condition to prevent the flow of current in said neutral line from said AC power source to said electrical load;

c) means for detecting ground faults coupled between said hot line and said neutral line on the line sides of said first and second operable switches to detect ground faults and produce a first output signal indicative of the detection of a ground fault condition;

d) a coupling device interposed between said means for detecting ground faults and said first and second selectively operable switches, wherein an absence of said first output signal from said means for detecting ground faults permits said first and second switches to remain in their first condition and a presence of said first output signal from said means for detecting ground faults causes said first and second selectively operable switches to switch to their second condition to prevent the flow of current;

e) a sensing device coupled to said hot line and said neutral line on a line side of said first and second selectively operable switches to detect the presence of current in both said hot line and said neutral line and generate an inhibit signal and in the absence of current on one or both of said hot and neutral lines to produce no inhibit signal;

f) a power supply coupled to said hot and neutral lines on the line side of said first and second selectively operable switches and to said hot and neutral lines on the load side of said first and second selectively operable switches;

g) an alarm device coupled to said power supply to receive operating voltages therefrom and to said sensing device to receive one of said inhibit and no inhibit signals, whereby in the presence of an inhibit signal from said sensing device while powered by said power supply, said alarm device is prevented from producing an alarm signal and in the presence of a no inhibit signal from said sensing device while powered by said power supply said alarm device is permitted to provide an alarm signal.

2. A ground fault circuit interrupter device, as defined in claim 1, wherein said alarm signal is a visible alarm signal.

3. A ground fault circuit interrupter device, as defined in claim 2, wherein said visible alarm signal is a light emitting diode.

4. A ground fault circuit interrupter device, as defined in claim 1, wherein said alarm signal is an audible alarm signal.

5. A ground fault circuit interrupter device, as defined in claim 4, wherein said audible alarm signal is a piezo transducer.

6. A ground fault circuit interrupter device, as defined in claim 1, wherein said alarm signal comprises a light emitting diode and a piezo transducer to produce visual and audible alarm signal.

7. A ground fault circuit interrupter device, as defined in claim 1, further comprising:

a) at least one electrical receptacle connected to said hot line and said neutral line on the load sides of said first and second selectively operable switches, said at least one electrical receptacle capable of supplying current to at least one electrical device plugged into said at least one electrical receptacle as long as said first and second selectively operated switches are in their first conditions.

* * * * *